United States Patent
Enomoto et al.

(10) Patent No.: US 6,876,118 B2
(45) Date of Patent: Apr. 5, 2005

(54) ABDUCTION-TYPE MOTOR AND FABRICATION METHOD OF MOTOR STATOR THEREOF

(75) Inventors: Yuji Enomoto, Hitachi (JP); Masashi Kitamura, Mito (JP); Miyoshi Takahashi, Hitachi (JP); Makoto Ochiai, Kiryuu (JP); Takashi Ando, Kiryuu (JP); Sachio Hatori, Kiryuu (JP); Yasuaki Motegi, Sano (JP); Toshimi Abukawa, Hitachiota (JP)

(73) Assignees: Hitachi, Ltd., Tokyo (JP); Japan Servo Co., Ltd., Tokyo (JP)

( * ) Notice: Subject to any disclaimer, the term of this patent is extended or adjusted under 35 U.S.C. 154(b) by 0 days.

(21) Appl. No.: 10/231,477

(22) Filed: Aug. 30, 2002

(65) Prior Publication Data

US 2003/0155834 A1 Aug. 21, 2003

(30) Foreign Application Priority Data

Feb. 19, 1920 (JP) ........................................ 2002-041290

(51) Int. Cl.[7] .......................... H02K 1/18; H02K 15/02; H02K 3/04
(52) U.S. Cl. ....................................... 310/180; 310/218
(58) Field of Search ................................ 310/216–218, 310/68 B, 71, 194, 179–180

(56) References Cited

U.S. PATENT DOCUMENTS 6,081,059 A * 6/2000 Hsu ........................... 310/179
6,163,952 A  12/2000 Takehara
6,356,005 B1 * 3/2002 Hsu ........................... 310/254

FOREIGN PATENT DOCUMENTS

| JP | 1-252141 | 10/1989 |
|---|---|---|
| JP | 7-222408 | 8/1995 |
| JP | 9-103052 | 4/1997 |
| JP | 2000-152528 | 5/2000 |

* cited by examiner

Primary Examiner—Tran Nguyen
(74) Attorney, Agent, or Firm—Crowell & Moring LLP

(57) ABSTRACT

In an abduction-type motor having a divided core 5(*a–l*) formed by dividing a stator core into plural blocks and a motor stator having such a structure as the divided core may be reassembled, the motor has a coil winding frame 6 continuously formed a continuous unit of coupling parts, a part of which is flexible and made of insulation material, embedded into the individual divided cores, and a coil 7 arranged and wound by supporting the divided core so that the teeth top parts of the divided core may be directed inside and located on a circle, in which its coil winding structure has the number of coil stages at the teeth top part (external peripheral part) of the divided core larger than the number of the coil stages at the internal peripheral part, and the diameter of the teeth top part of the divided core after assembly is identical to the diameter of the teeth top part while coil winding work, and the length of the crossover line 7s between the coil windings is made enough to be equivalent to a single slot or more, not excessive or not insufficient.

3 Claims, 7 Drawing Sheets

CONTINUOUS COIL WINDING WORK WITH 90° ARRANGEMENT FOR A SINGLE PHASE COIL

EXCESSIVE CROSS-OVER LINE LENGTH

INSUFFICIENT CROSS-OVER LINE LENGTH 10P-12S COIL ARRANGEMENT

12 COIL BOBBINS MADE BY CONTINUOUS MOLDING

ABDUCTION-TYPE MOTOR AND FABRICATION METHOD OF MOTOR STATOR THEREOF

This application claims the priority of Japanese Application No. 2002-41290, filed Feb. 19, 2002, the disclosure of which is expressly incorporated by reference herein.

BACKGROUND AND SUMMARY OF THE INVENTION

The present invention relates to an abduction-type motor such as drive motor for information devices, fan motor and disk drive motor and to a fabrication method of its motor stator.

Generally the fabrication of an abduction-type motor involves simple coil winding machine work in order to obtain high-density coil windings. However, recent requirements include coil winding with even higher density in order to downsize the motor and increase its efficiency. In order to meet this requirement, and to enable the stator structure to increase the occupied coil volume, a divided type stator is used which has its core divided into several parts, each corresponding to the individual poles and with the stator being fabricated after the coil winding work.

Japanese Patent Laid-Open Number 2000-152528 is an example of a prior art abduction-type motor with a divided stator core. In this method, the divided cores are linked together with thin magnetic material at the heads of the teeth parts of the individual divided cores, and the cores, which are die-cut in a rectilinear shape, are assembled in a circle after the coil winding work. Then, the single end part is fastened. In this example, the final step is completed by fastening the single end part by using the coupling pin, which may be fixed alternately by welding work.

Since the magnetic poles are connected by magnetic materials in the above prior art, magnetic flux leakage may occur between the magnetic poles and the efficiency of the motor may be significantly reduced. Though the machine-wound operation can be applied by machines for the individual divided cores at the coil winding work, the finishing work for the end part of the individual coil winding is required instead of finishing the end part of the entire continuous coil line. It is especially required to wind a set of coils for an identical phase at the divided cores separated away from one another in a multi-phase and multi-pole machine, and in this example, the finishing work for the coil winding is required for the individual divided core, which requires an extended period of time.

An example of the coil winding is shown in FIG. 2. In this example, the stator core 5 having 12 poles is shown, and in case of applying the coil winding work with the coil 7 for the single phase (corresponding to four poles) at the divided core, it is assumed is such a method, as shown in FIG. 2(a), that four poles are made supported in a circumferential direction by the support tool for the coil winding work, applied by the coil winding machine flyer 31. When the length of the crossover line is longer or shorter than the designated line length, this method can be only applied to the motor in which four coils are arranged uniformly at 90° positions. For example, as the coil arrangement for 10 poles and 12 slots is thus shown in FIG. 2(b), the excessive length arises at the crossover line between adjacent coils, and thus the insufficient length arises at the crossover line between coils with rotational symmetry. Thus, it is one of problems to be solved in coil winding to reduce the excessive and/or insufficient length of the crossover line.

In addition, when fabricating the divided cores, it is important to fabricate the divided cores so as to prevent the wound coils from interfering one another. In case of applying the coil winding method shown in FIG. 2(a), the line extended between the start point and the end point for the wound coil is located inside the inner diameter of the core. This is because the coil winding work is performed while the tension applied during the coil winding work is directed inside the inner diameter, which causes the irregular coil outline even if the start point and the end point of the coil are forced to be located in the direction toward the outside diameter, and ultimately the occupied volume of the coil is reduced.

An object of the present invention is to provide a high-efficiency and small abduction-type motor and a fabrication method of its motor stator whereby the stator core is divided, the coil winding work is applied to the divided cores with higher occupied volume, and the stator core, including the coil windings, is configured to be easily reassembled so that the finishing work for the end part of the individual coil winding may be eliminated and a continuous machine-wound is formed.

In order to solve the above problems, in an abduction-type motor having a divided core formed by dividing a stator core into plural blocks, and a motor stator having such a structure as the divided core may be reassembled, the motor has a coil arranged and is wound by supporting the divided core so that the teeth top parts of the divided core are directed inside and located on a circle, and the lead lines for the start of the coil winding and the end of the coil winding are arranged at the teeth top parts.

In the coil winding structure of the divided core, the number of coil stages, for the teeth top parts of the divided cores located outside, is made larger than the number of coil stages for the inside parts.

The diameter of the teeth top part of the divided core, after assembly, is identical to the diameter of the teeth top part of the divided core maintained during the coil winding work, and the finished coil winding is so formed as to have an adequate pressure extended length for a single slot.

The stator core has a coil winding frame formed as a series of units, each coupled at the coupling parts made of insulation material and embedded into the individual divided core, a part of which can be flexibly bent.

In the assembly method of the abduction-type motor having a divided core formed by dividing the stator core into plural blocks with its teeth top parts arranged in the direction to the outside and having such a structure as to be reassembled with said divided cores, the motor stator is assembled by means of a coil winding frame formed as a series of units. Each unit is coupled by coupling parts made of insulation material and embedded into the individual divided core, a part of which can be flexibly bent. The coupling parts of the coil winding frame are deformed and arranged during the coil winding work so that the teeth top parts of the divided core may be arranged on a hypothetical circle and directed to its inside. The coil winding work is applied continuously to the divided cores, and the coupling parts of the coil winding frame is deformed after the coil winding work, so that the teeth parts of the divided core may be directed to the outside.

According to the present invention, since the abduction-type motor is structured so that its stator core may be formed as a set of divided and coupled units, and its coupling part makes it possible to reassemble the divided units easily, it will be appreciated that a continuous machine-wound work can be realized without processing the cable terminals of the coil windings, and that a high-efficiency and small-sized abduction-type motor can be realized.

In addition, as the continuous coil winding work is enabled by directing the teeth top parts of the divided cores outside and arranging them on a hypothetical circle at the coil winding work, and the stator core is assembled by transforming the divided cores at the center of the engagement part of the coil winding frame after the coil winding work so that its teeth top parts may be directed inside, the length of the individual crossover lines between the divided cores when arranging the teeth top parts so as to be directed outside and located on the hypothetical circle at the coil winding work can be almost identical to the necessary length of the individual crossover lines after the assembly process, and thus, it will be appreciated that the terminal process for the coil cable at the assembly process can be eliminated.

As the teeth top parts of the divided cores are arranged inside and the number of coil stages for the teeth top parts of the divided cores (located outside) is made larger than the number of coil stages for their inside parts, which leads to the optimum arrangement of the crossover lines at the teeth top part, that is, the circumferential part of the cores assembled as the stator core, for the start of the coil winding and the end of the coil winding, it will be appreciated that the interference between the coils at the assembly process can be avoided.

In addition, as the continuous machine-wound work without any coil winding work can be realized, it will be appreciated that the structure for assembling the divided cores while their crossover lines being connected can be realized and the freedom of the core shape can be extended. As the magnetic material is not used near the teeth parts of the divided cores, it will be appreciated that the magnetic leakage between the teeth can be avoided and thus the efficiency can be increased. And furthermore, as a single unit is assembled in the coil winding frame with the insulation part, it will be appreciated that the easy assembly process can be established and that a small-sized and low-cost abduction-type motor can be realized.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
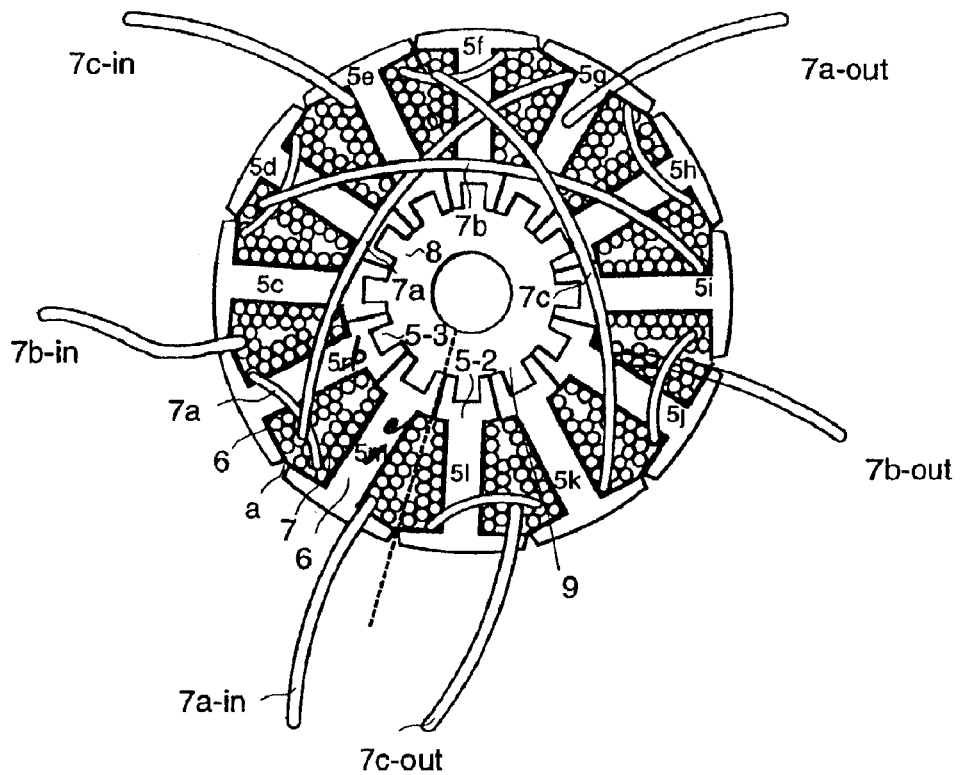
FIG. 1 shows a schematic diagram illustrating the stator core of the basic abduction-type motor and the coil winding structure in one embodiment of the present invention.

FIG. 1 shows a schematic diagram illustrating the structure of the stator core of the basic abduction-type motor in one embodiment of the present invention. The stator core is so structured as to be divided into plural divided cores 5 divided in the circumferential direction in the abduction-type motor, in which the convex-shaped engage parts 5-2 are formed in the individual inside peripheral side of the divided cores 5, and the individual divided cores 5 are fixed by means that the concave-shaped engage parts 5-3, enabled to be engaged with the engage parts 5-2, are formed at the stator support members 8 shaped in a cylinder to be arranged at the inside peripheral of the divided core 5. The rotor which is not shown is arranged around the stator of the abduction-type motor and this rotor has a rotary yoke and a permanent magnet.

In this embodiment, what is shown is an example of an arrangement for three-phase, ten-pole and twelve-divided core parts (5a to 5l), and ten arc-type magnets (not shown). The divided core 5 is divided into 12 parts, and the coil winding frames 6 individually insulated are arranged in a single divided core 5 as shown in the figure, and then, the coil winding (coil) 7 is made wound at the coil winding frame. Twelve divided cores 5 are assigned to the individual three phases, A, B and C, in which A-phase is defined by the cores 5a and 5b and the 5g and 5h arranged diagonally, B-phase is defined by the cores 5c and 5d and the cores 5i and 5j, and C-phase is defined by the cores 5e and 5f and the cores 5k and 5l, thus, the individual phase corresponds to four divided cores 5, respectively.

The coil winding frame 6 is bonded at the coupling part a as shown in the figure, and it is so configured as to be deformed with respect to the coupling part as the base point.

Now, referring to FIGS. 3(a–d), the coil winding frame 6 is described in detail. The identical numbers are assigned to the identical parts to those in FIG. 1.

Figure 3A:
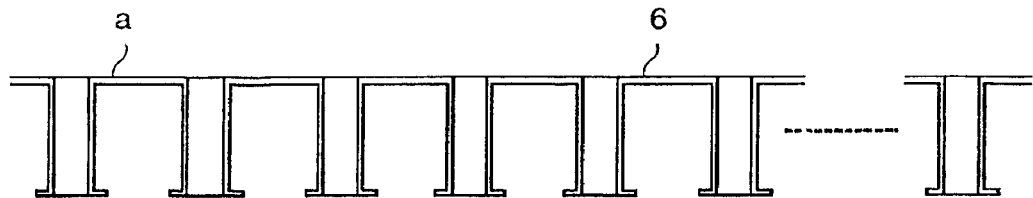
FIGS. 3(a–d) illustrates the coil winding frame having engaging parts linked to one another and the relation between the divided core and the coil winding frame.
Figure 3B:
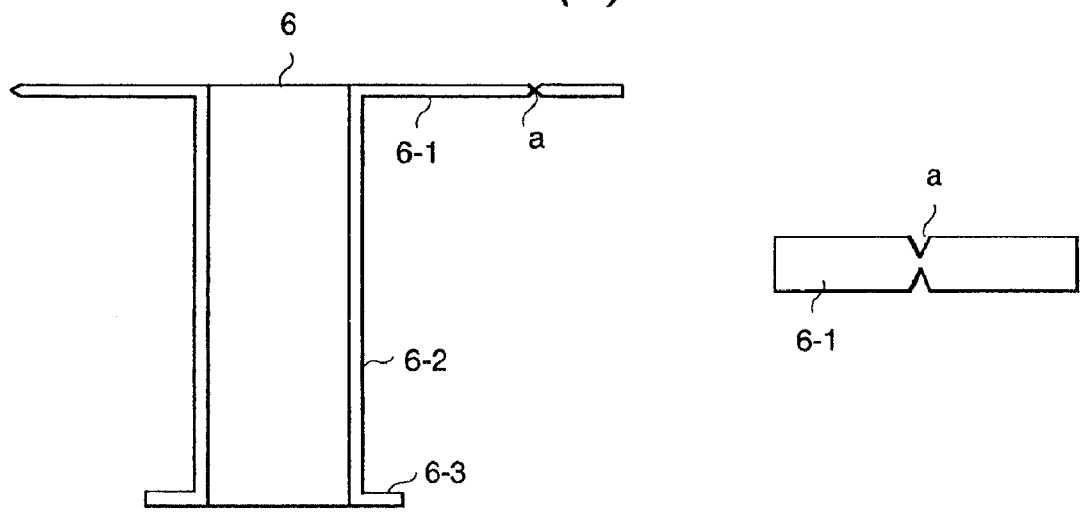

As shown in FIG. 3(a), coil winding frames 6 are coupled at the coupling parts a excluding the both end parts. As shown in the magnified view of FIG. 3(b), the single coil winding frame is composed of the teeth-side frame 6-1, the intermediate frame 6-2, the engagement-side frame 6-3 and the coupling part a, in which, as shown in the magnified view of the detail cross-sectional view, the coupling part a is made as thin-walled member and flexible in the vertical direction in the figure. In other words, the coil winding frame 6 which is formed as a series of units, each coupled at the coupling parts made of insulation material, a part of which can be flexibly bent, can be bent up and down.

Figure 3C:
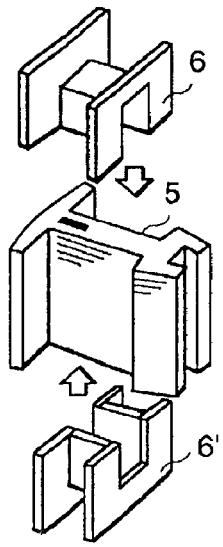
Figure 3D:
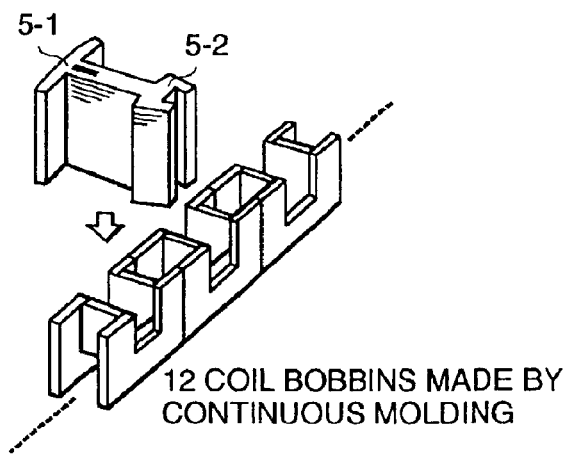

FIG. 3(c) shows the relation between the divided core 5 and the coil winding frame 6. This figure is a perspective view of the single unit of the coil winding frames 6 and the divided core 5 to be engaged into one of the coil winding frames 6, and FIG. 3(d) is an assembly drawing for installing the divided core 5 into the coil winding frames 6 with adjacent frames coupled continuously. As found in the figures, the divided core 5 has a teeth part 5-1 and an engagement part 5-2, and the width of the top of the teeth part 5-1 is made wider where the magnetic field generated by the rotator (not shown) can be detected so efficiently as to be able to make the best use of the magnetic field. The engagement part 5-2 is shaped in a reverse taper in order to support the stator by the stator support member 8 (in FIG. 1) engaged with the engagement part so as to endure the motor torque and prevent the engagement part from being pulled out due to the centrifugal force. In addition, as found in the figures, the coil winding frames 6 are divided into two parts, 6 and 6', in the longitudinal direction at the center line of the side wall of the frame.

Thus, after the divided cores 5 are supported by the series coil winding frames 6 and 6', they are arranged in a single line as shown in FIG. 3(*a*). The coil winding frame 6 can be formed by insert molding with the divided cores 5 arranged, and it will be appreciated in the insert molding that the mechanical precision of the individual parts of the coil winding frame 6 can be increased.

Figure 2A:
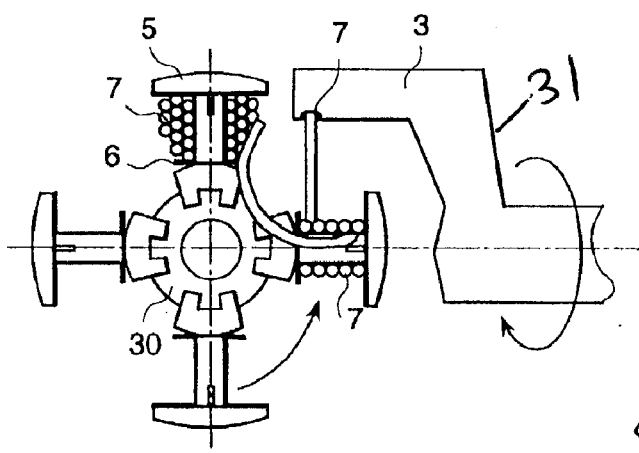
FIGS. 2(a–b) details the conventional method for winding a coil in the divided core.
Figure 2B:
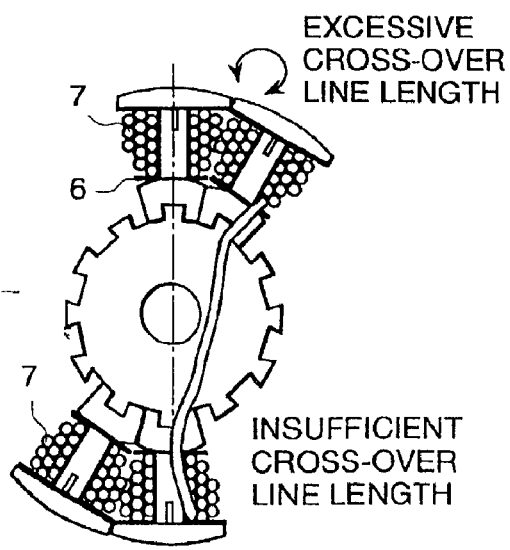
Figure 4:
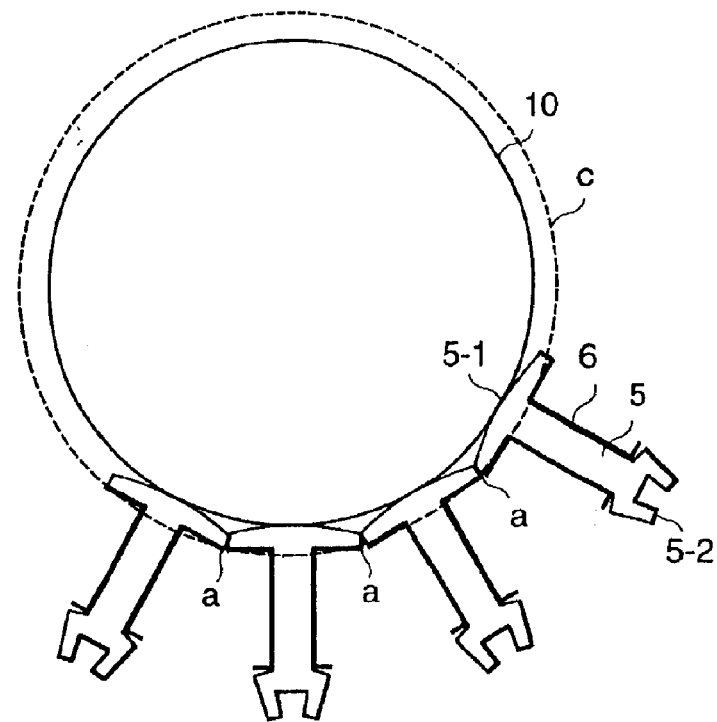
FIG. 4 illustrates an example of the structure in which the coil winding frame of the invention is installed in the divided core and the top of the teeth parts is made directed inside and arranged on a circle.

FIG. 4 shows an example of the circular arrangement for facilitating the coil winding work. The identical numbers are assigned to the identical parts to those in FIGS. 1 to 3. FIG. 4 illustrates expediently such an example that the number of divided cores 5 is four, which can be extended to any larger number with the same manner.

As shown in the, the divided cores 5 supported by the individual coil winding frames 6 are made bent at the coupling parts a so that the teeth parts 5-1 are directed inward. The envelope developed by the coupling parts a makes a circle C shown by the broken line. In this state, as the engagement parts 5-2 having a narrow width locate outside, the coil winding 7 can be wound continuously by machine-wound work. At this process, the cylindrical support tool 10 is applied inside the teeth parts 5-1 for stabilizing the machine-wound work.

Figure 5:
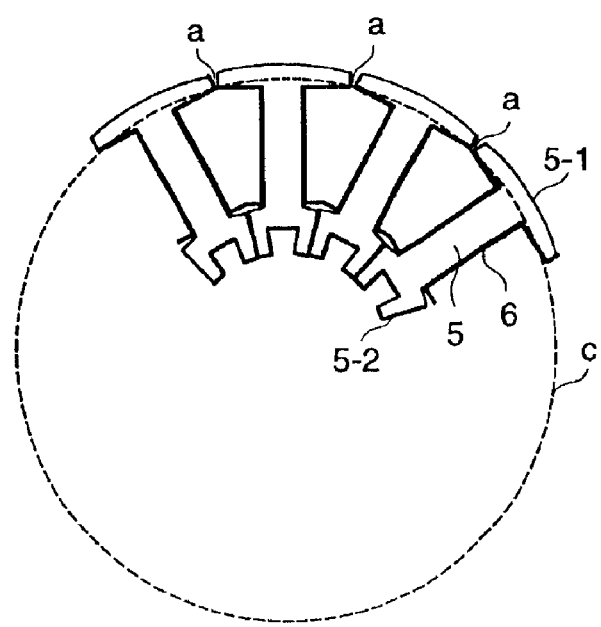
FIG. 5 illustrates an example of the structure in which the coil winding frame of the invention is installed in the divided core and the top of the teeth parts is made directed outside and arranged on a circle.

FIG. 5 illustrates interpretatively the formation of the abduction-type stator cores starting from the state as described above. As shown in the figure, in bending the coupling parts a in the direction opposite to the state shown in FIG. 4, the teeth pars 5-1 of the divided cores 5 face outward to the circle C shown by the broken like, and then, the circle C developed by the engagement parts 5-2 moves inside and the adjacent units contacts to each other. Then, the stator support members 8 (in FIG. 1) are made inserted and fixed.

As described above, in this embodiment, it will be appreciated that the abduction-type stator cores can be assembled easily.

Figure 6:
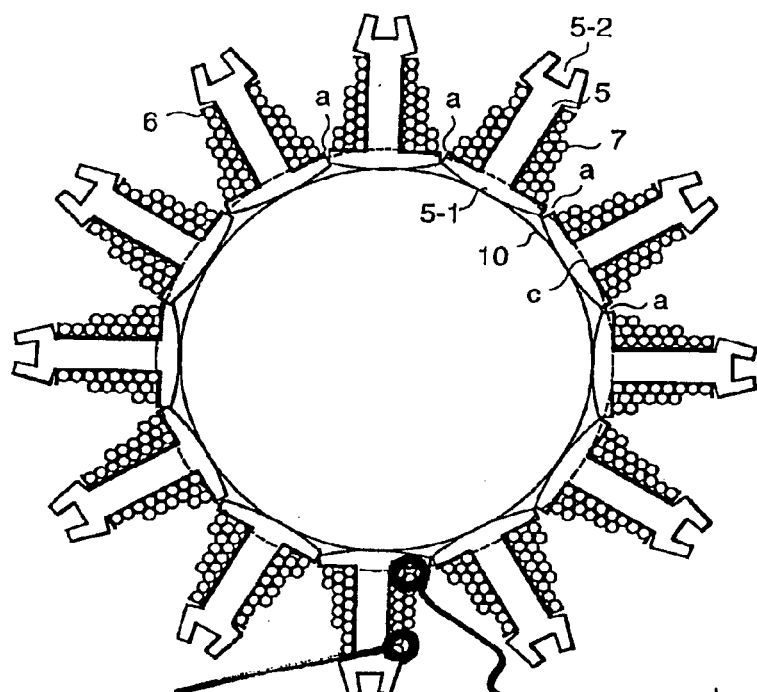
FIG. 6 illustrates an example of the structure in which the coil winding frame of the invention is installed in the divided core and the coil winding work is applied while the teeth parts are made directed inside and arranged on a circle.
Figure 7:
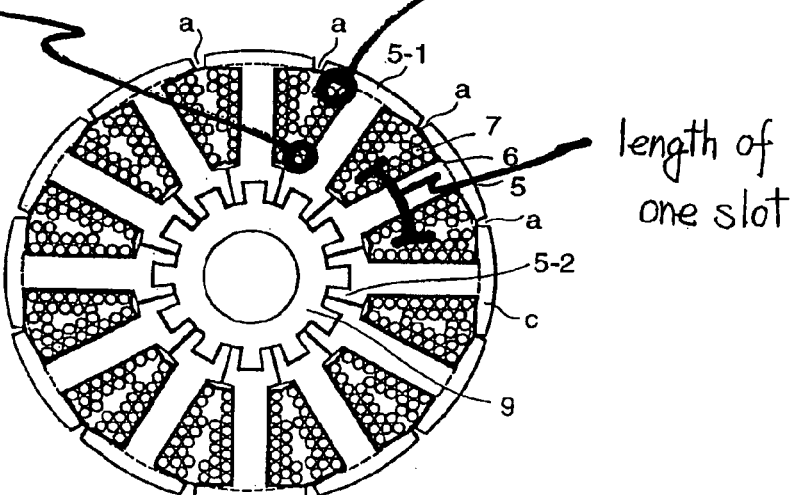
FIG. 7 is a cross-sectional drawing illustrating the state of the core with a coil wound assembled as the motor stator.

FIG. 6 shows a cross-section view of the state after the coil winding is completed, in which the coil winding work for the individual divided cores 5 is operated with the coil winding frames 6. The identical numbers are assigned to the identical parts to those in FIGS. 1 to 5.

The process for forming the abduction-type stator cores with the divided cores 5 from this state is the same as the case illustrated by FIGS. 4 and 5, and the shape of the abduction-type stator cores is defined, and then, the stator support member 8 can be fixed by pressing it in the axial direction, and consequently, the abduction-type stator cores can be completed.

In order to prevent the interference among the coil windings in the assembly process, it is required that the number of layers (the number of phase of the coil winding) (the number of layers is 3 in FIG. 6) at the top of the teeth parts is larger than the number of layers (the number of layers is 1 in FIG. 6) at the bottom of the core of teeth parts 5-1 (inside).

In this coil winding method, as the coil winding process is applied with the top of the teeth part 5-1 being located inside, and as the start and end of the coil winding are located inside the position for the coil winding operation, that is, located at the top of the teeth part 5-1, it will be appreciated that the interference among the coil wires can be prevented in the assembly process and the assembly process itself is completed easily.

Figure 8A:
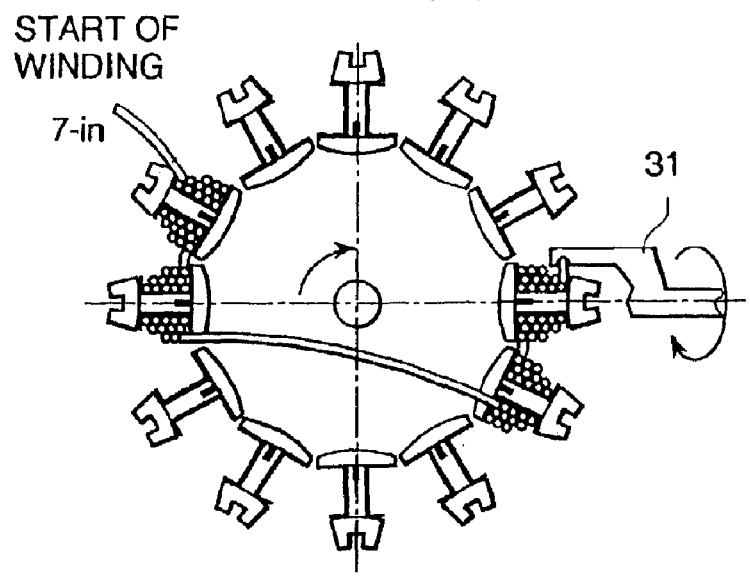
FIG. 8 illustrates the process of applying a continuous coil winding work and the coil winding method.
Figure 8B:
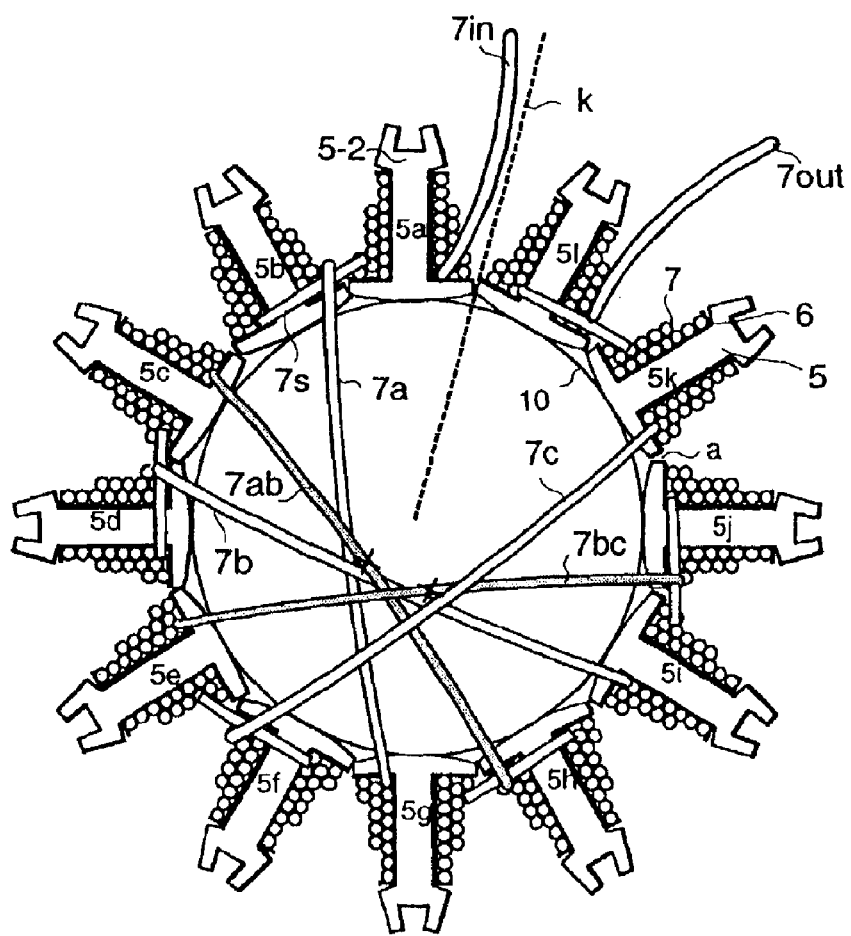

The positions of the start and end of the coil winding in the coil winding work and the arrangement of the crossover line as well as their relationship are described in FIG. 8(*a–b*) and subsequent figures. FIG. 8(*a–b*) shows the coil winding state in case of the three-phase and ten-pole device. FIG. 8(*a*) illustrates the state of the coil winding work for the first phase, and FIG. 8(*b*) illustrates the state of the coil winding work continued up to the third phase. As shown in FIG. 8*b* with twelve units (5*a* to 5*l*) of the divided core 5, the teeth parts 5-1 are supported by the coil winding frames 6 and arranged on the supporting member 10 so as to direct to the center. As the coil winding frames 6 between the divided cores 5*a* and 5*l* discontinues to each other at the boundary shown by the broken line k, the coil winding frames are fixed by a tool (not shown).

FIG. 8(*a–b*) is an example of processing the coil winding work sequentially in three phases, A-phase, B-phase and C-phase, and the coil winding work starts at the coil winding of the divided core 5*a* for A-phase. The component 7 in is a lead line for the start of the coil winding work. Once the coil winding work for the divided core 5*a* is completed, the coil winding work for the divided core 5*b* is initiated next with its winding direction reversed, in which the crossover line due to this transition is the component 7*s*. After the coil winding work for the divided core 5*b* is completed, the coil winding work for the divided core 5*g* for the A-phase on the diagonal position opposite to the divided core 5*a* is initiated with the crossover line 7*a*. After completing the coil winding work for the divided core 5*g*, the coil winding work for the divided core 5*h* adjacent to the divided core 5*g* is initiated, and next, the coil winding work for the divided core 5*c* for B-phase is initiated with the crossover line 7*ab*. The crossover line bridging those phases is cut at the position marked with the symbol X and its cable terminals are treated subsequently. As for B-phase, in the similar manner to A-phase, the coil winding works for the divided cores 5*c*, 5*d*, 5*i* and 5*j* are processed in sequence, and then, the coil winding works for the divided cores 5*e*, 5*f*, 5*k* and 5*l* for C-phase are processed and finally the coil winding works are completed at the lead line 7 out. In the result of those coil winding works, six crossover lines 7*s* bridges the individual adjacent divided cores, and three crossover lines 7*a*, 7*b* and 7*c* extended longer and a couple of crossover lines, 7*ab* and 7*bc*, bridge the divided cores with different phases.

Figure 9A:
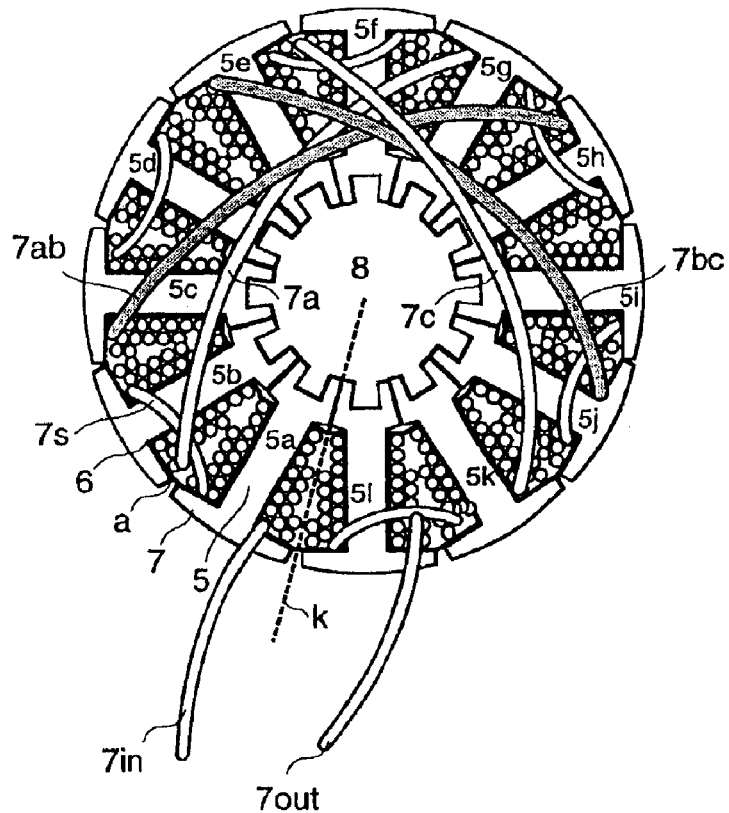
FIG. 9 illustrates the shape of the coil-wound stator core and its assembly process in the motor stator.
Figure 9B:
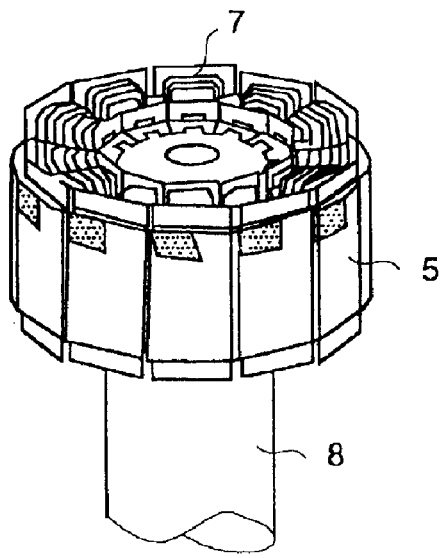
Figure 9C:
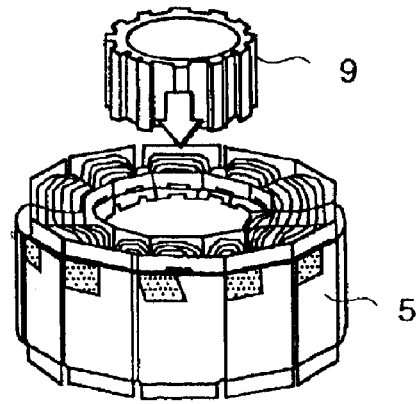

Now, suppose that the circle shown in FIG. 8(*b*) is cut at the broken line k between the divided cores 5*a* and 5*l* and that the divided cores 5*a* and 5*l* are made turned over so that the engagement parts 5-2 of the divided cores may be located inside as shown in FIG. 9(*a–c*). FIG. 9(*a*) shows the assembled state of the abduction-type stator, FIG. 9(*b*) is a perspective view of the assembled stator supported by the stator support member, and FIG. 9(*d*) is a perspective view of the state of the process of inserting the housing.

Note that the hypothetical circle (the circle C drawn in the broken line in FIG. 4 and FIG. 5) defined by connecting the engagement parts a of the coil winding frame 6 shown in FIG. 8 holds an identical length (an identical diameter) at the coil winding work and the assembly process, and that the crossover line of the coil winding 7 after the assembly process has an adequate extended length for a single slot or more in comparison to the coil winding process, not excessive or not insufficient, which leads to making no obstacle or no shortage for establishing the state transition from FIG. 8 to FIG. 9. This transition can be realized by means that the engagement part a composed of insulation material which enables on part of the coil winding frame 6 to bend flexibly is formed near the teeth part 5-1 from the center of the divided core 5. After the transition to the state shown in FIG. 9, the divided core 5 is made fixed by inserting the housing 9 and then the assembly process for the stator is completed.

Figure 10:
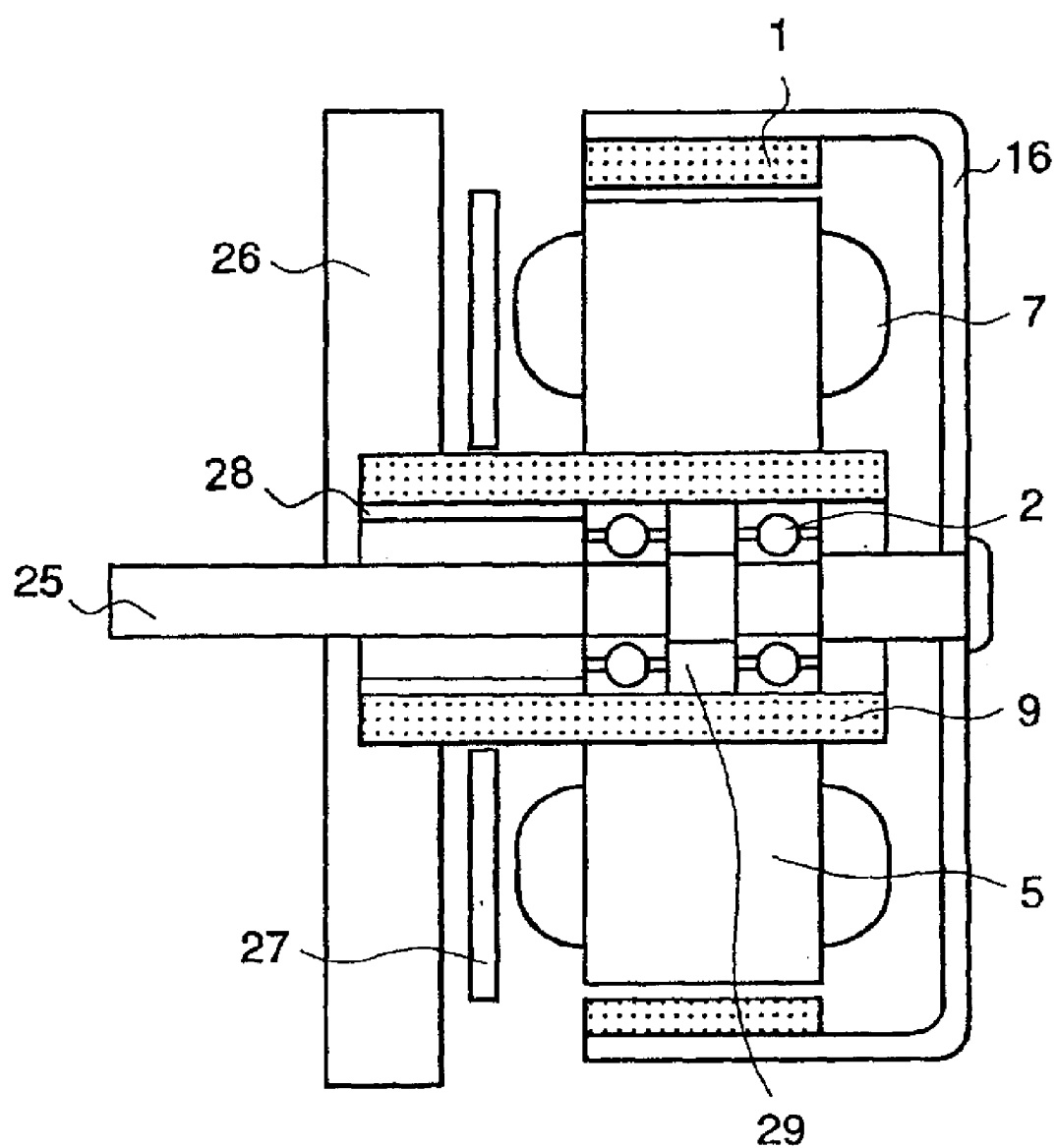
FIG. 10 is a structural drawing of the motor illustrating an example of the structure of the abduction-type motor of the present invention.

FIG. 10 shows an example of the structure of the motor having the above described stator core structure. The bearing 28 is arranged with the curler 29 in the inside of the housing 9 which is fixed firmly in the stator core 5 having the coil winding (coil) 7, and then the motor shaft 25 is arranged. The cup-shaped stator case 16 is coupled together at the end part of the shaft 25, and the rotor 1 is arranged by any bonding method at the inside of the rotor case 16 facing to the stator core 5. The bonding between the base part 26 of the motor and the housing 9 is fixed by press fitting, screw fastening, shrinkage fitting or welding, and then the control board 27 is made arranged between the stator and the base.

According to this structure, it will be appreciated that a low-cost, compact, high-torque and high-efficiency motor can be obtained.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An abduction motor, comprising:

a stator core arrangement including a plurality of divided cores having teeth wherein a top part of each of said teeth are arranged together in a form of a circle and wherein said teeth extend from each of said top parts toward a center of said circle;

a coil winding structure wound on said plurality of divided cores, said coil winding structure including a plurality of wound sections each of said wound sections being formed on a corresponding one of said teeth and each of said wound sections having an input lead and an output lead wherein each of said input lead and output lead are arranged at said top part of said teeth, wherein said coil winding arrangement has an extended length between adjacent divided cores substantially the same as a length of a single slot wherein said length of said single slot is a distance between a center of a divided core and an adjacent case.

2. The abduction motor of claim 1, wherein, said coil winding structure of said divided core, has a number of coil stages positioned at said top parts of said teeth which is larger than a number of coil stages at bottom parts of said teeth.

3. The abduction motor of claim 1, wherein said stator core has a coil winding frame formed as a series of units, each unit coupled at coupling parts made of insulation material and embedded into said each of said individual divided cores, a part of which is able to be flexibly bent. flexibly bent.

* * * * *